US008616538B2

(12) United States Patent
Al-Dahhan et al.

(10) Patent No.: US 8,616,538 B2
(45) Date of Patent: *Dec. 31, 2013

(54) SPRING SEAT ASSEMBLY

(75) Inventors: Sadiq Al-Dahhan, Dearborn, MI (US); William G. Dieter, Taylor, MI (US)

(73) Assignee: BASF Corporation, Florham Park, NJ (US)

( * ) Notice: Subject to any disclaimer, the term of this patent is extended or adjusted under 35 U.S.C. 154(b) by 1470 days.

This patent is subject to a terminal disclaimer.

(21) Appl. No.: 11/146,569

(22) Filed: Jun. 7, 2005

(65) Prior Publication Data

US 2006/0082038 A1 Apr. 20, 2006
US 2006/0208406 A2 Sep. 21, 2006

Related U.S. Application Data

(60) Provisional application No. 60/620,590, filed on Oct. 20, 2004.

(51) Int. Cl.
*F16F 5/00* (2006.01)
(52) U.S. Cl.
USPC .................................................... 267/220
(58) Field of Classification Search
USPC .......... 267/219, 220, 221, 292–294, 152, 153
See application file for complete search history.

(56) References Cited

U.S. PATENT DOCUMENTS

| | | | |
|---|---|---|---|
| 4,462,608 A | 7/1984 | Lederman | |
| 4,690,428 A * | 9/1987 | Fluegge | 280/124.151 |
| 4,804,169 A | 2/1989 | Hassan | |
| 4,805,886 A | 2/1989 | Hassan | |
| 5,000,429 A | 3/1991 | Wittmar et al. | |
| 5,158,269 A | 10/1992 | Hein et al. | |
| 5,421,565 A | 6/1995 | Harkrader et al. | |
| 5,467,970 A | 11/1995 | Ratu et al. | |
| 6,155,544 A | 12/2000 | Solomond et al. | |
| 6,182,953 B1 | 2/2001 | Smith et al. | |
| 6,254,072 B1 | 7/2001 | Bono et al. | |
| 6,296,237 B1 | 10/2001 | Nagai | |
| 6,412,798 B2 | 7/2002 | De Fontenay et al. | |
| 6,485,008 B1 | 11/2002 | Griffin | |
| 6,733,023 B2 * | 5/2004 | Remmert et al. | 280/124.179 |
| 6,736,381 B2 * | 5/2004 | Chesne | 267/220 |
| 7,077,248 B2 * | 7/2006 | Handke et al. | 188/321.11 |
| 2001/0015537 A1 | 8/2001 | De Fontenay et al. | |
| 2002/0109328 A1 * | 8/2002 | Remmert et al. | 280/124.147 |
| 2003/0132561 A1 | 7/2003 | Burlage et al. | |
| 2004/0075204 A1 | 4/2004 | Heidemann et al. | |
| 2006/0043659 A1 * | 3/2006 | Gofron et al. | 267/220 |
| 2006/0082037 A1 * | 4/2006 | Al-Dahhan | 267/179 |

FOREIGN PATENT DOCUMENTS

EP 0 778 166 B1 11/2001

* cited by examiner

*Primary Examiner* — Xuan Lan Nguyen
(74) *Attorney, Agent, or Firm* — Howard & Howard Attorneys PLLC

(57) ABSTRACT

A vehicle suspension system including a pair of spring seat retainers. One of the spring seat retainers includes a flange and a pocket portion extending from the flange to a distal rim. A jounce bumper is mounted to the pocket portion of the spring seat retainer and extends from the rim. A band encircles the rim for preventing deformation of the rim upon compression of the jounce bumper.

37 Claims, 5 Drawing Sheets ively appreciated, as the same becomes better understood by reference to the following detailed description when considered in connection with the accompanying drawings wherein:

FIG. 1 is a cross-sectional view of a suspension system;
FIG. 2 is a perspective view of a first spring seat retainer engaging a coil spring;
FIG. 3 is an exploded view of the first spring seat retainer;
FIG. 4 is a perspective view of the first spring seat retainer;
FIG. 5 is a side view of the first spring seat retainer; and
FIG. 6 is a cross-sectional view of the suspension system in a compressed state.

DETAILED DESCRIPTION OF THE PREFERRED EMBODIMENT

Referring to the Figures, wherein like numerals indicate like or corresponding parts throughout the several views, a suspension system 18 for a vehicle (not shown) of the type with which the instant invention is utilized is generally shown in FIG. 1. The suspension system 18 includes a spring seat assembly, a plurality of spring seats 26, and a coil spring 24. Each of the spring seats 26 include a planar portion and a protrusions 16 extending from the corresponding planar portion. The spring seats 26 are preferably made of steel and are mounted to corresponding structures (not shown) of the vehicle. The coil spring 24 is shown for illustrative purposes in phantom and does not form part of the claimed invention.

The spring seat assembly includes a first spring seat retainer 20 and a second spring seat retainer 22 wherein the first and second spring retainers 20, 22 define corresponding chambers (not numbered) for mating with corresponding protrusions 16 of the spring seats 26. In particular, the first and second spring seat retainers 20, 22 are mounted to associated spring seats 26 having the coil spring 24 disposed therebetween. One skilled in the art will appreciate that the first and second spring seat retainers 20, 22 may be of any suitable configuration to mount to alternative spring seats and/or alternative suspension systems.

Referring also to FIGS. 2-5, the first spring seat retainer 20 is shown having a base 28, which is preferably a flange 28 extending radially from a central axis 14, and a pocket portion or neck 30 extending axially from the flange 28 to a distal rim 32 for supporting the coil spring 24 encircling the pocket portion 30. Preferably, the flange 28 and the pocket portion 30 are formed of a homogeneous material. Even more preferably, the first spring seat retainer 20 may be formed of a polymeric material or plastic material such as nylon, isoprene, polypropylene, or polyurethane. Preferably, the first spring seat retainer 20 is formed of a one-piece integrated thermoplastic polyurethane (TPU) material.

A plurality of ribs 48 are spaced circumferentially about an exterior of the pocket portion 30 for engaging and retaining the coil spring 24. The ribs 48 extend axially from a predetermined distance spaced from the flange 28 to a shoulder 44. The ribs 48 are preferably integral with the pocket portion 30.

The distal rim 32 of the pocket portion 30 defines a distal end 72 and a cavity 34 (see FIG. 3) between the distal end 72 and the flange 28. The rim 32 also defines an inner surface and an outer surface with the outer surface defining a recess 42 extending axially from the distal end 72 to the shoulder 44. The distal end 72 of the rim 32 flows over the recess 42 to form a projection 46 extending radially outwardly. The rim 32 includes a securing device, represented by a plurality of tabs 52 disposed about the inner surface of the rim 32 and projecting in the cavity 34. The tabs 52 are preferably integral with the inner surface of the rim 32. The first spring seat retainer 20 further includes a stem 58 disposed in the cavity 34 of the rim 32.

SPRING SEAT ASSEMBLY

CROSS REFERENCE TO RELATED APPLICATION

This application claims the benefit of U.S. provisional patent application Ser. No. 60/620,590, which was filed on Oct. 20, 2004.

BACKGROUND OF THE INVENTION

1. Field of the Invention

The invention relates to an assembly for a suspension system of a vehicle of the type using a coil spring isolator.

2. Description of the Prior Art

Vehicle suspension systems of the prior art typically include spring seat assemblies each having a pair of opposing spring seat retainers with a coil spring disposed therebetween. Spring seat retainers of a variety of configurations are well known in the art. An example of a configuration of a spring seat retainer is shown in European Publication No. 0 778 166 B1. The spring seat retainer disclosed in this European Publication is formed of a polymeric material and includes a flange extending radially from a central axis. A pocket portion extends axially from the flange to a distal rim for defining a groove to support a coil spring encircling the pocket portion. The pocket portion also defines a cavity for supporting a jounce bumper. The design and material considerations of the spring seat retainer disclosed in the European Publication provides significant advantages over other prior art retainers.

During operation, the coil spring can be compressed to the point where the jounce bumper engages an opposing spring seat retainer to cause the jounce bumper to compress and exert forces radially outwardly against the rim. These radial forces on the rim can be large enough to cause the rim to deform or bulge, especially if the rim is made out of the polymeric material, i.e., plastic. The functionality of the spring seat retainer can be lost after the rim radially stretches and permanently deforms the cavity, which can cause the jounce bumper to fall out of the cavity.

Accordingly, it would be desirable to develop a spring seat retainer that incorporates the advantages of the prior art retainers while avoiding the potential drawbacks of these retainers.

SUMMARY OF THE INVENTION AND ADVANTAGES

The invention provides a spring seat assembly for a suspension system of a vehicle utilizing a coil spring. The spring seat assembly comprises a spring seat retainer having a flange extending radially from a central axis and a pocket portion extending axially from the flange to a distal rim for supporting one end of the coil spring encircling the pocket portion. The distal rim of the pocket portion defines a distal end and a cavity between the distal end and the flange for mounting a jounce bumper within the cavity. The jounce bumper extends from the distal end for compressing and exerting radial forces within the cavity against the rim upon a predetermined compression of the coil spring. A band encircles the rim of the pocket portion for preventing deformation of the rim under the band thereby retaining the jounce bumper in the cavity upon the predetermined compression of the coil spring.

BRIEF DESCRIPTION OF THE DRAWINGS

Other advantages of the present invention will be readily

The rim 32 can undergo undesirable bulging and other deformation from heat and pressure. The subject invention therefore includes a restrictor 40 at least partially disposed about the rim 32 of the pocket portion 30, which operates as an anti-bulging device for preventing bulging of the rim 32. The restrictor 40 preferably includes a band 40 encircling the rim 32 for preventing bulging of the rim 32 under the band 40. The band 40 is preferably continuous, presents spaced edges, and is disposed in the recess 42 with one of the edges abutting the shoulder 44. The projection 46 extends over the other edge of the band 40 opposite the shoulder 44 to retain the band 40 in the recess 42. Hence, the band 40 encircles the rim 32 of the pocket portion 30 for preventing deformation of the rim 32 under the band 40. The band 40 is preferably made of a metal, such as steel, and has a modulus of elasticity higher than the modulus of elasticity of the polymeric material of the pocket portion 30.

A spring isolator 36 abuts the flange 28 of the first spring seat retainer 20. The spring isolator 36 preferably has a donut shaped configuration complementary to the configuration of the flange 28. Preferably, the spring isolator 36 is formed of an elastomeric material, such as micro-cellular polyurethane (MPU).

Figure 1:
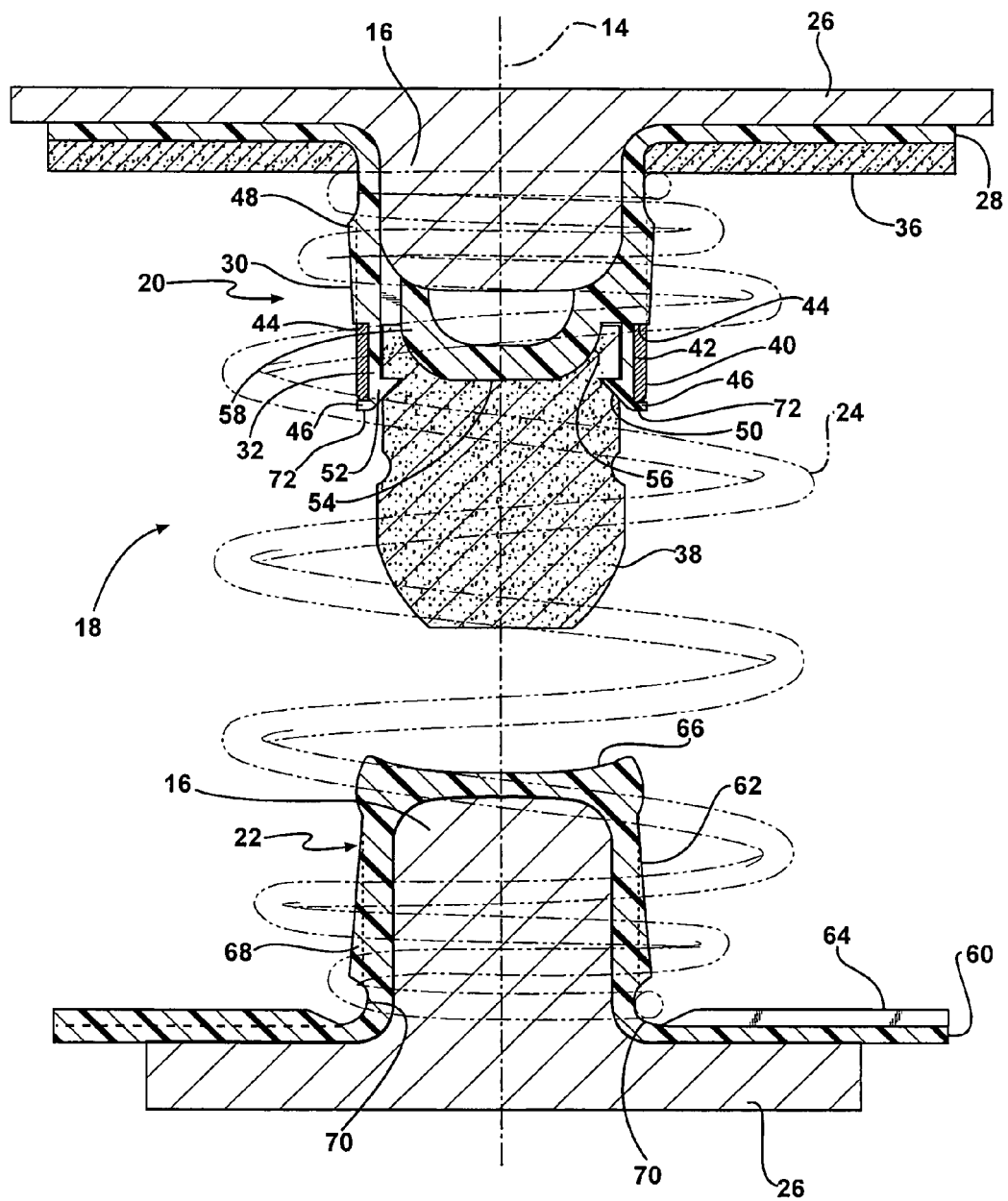
Figure 2:
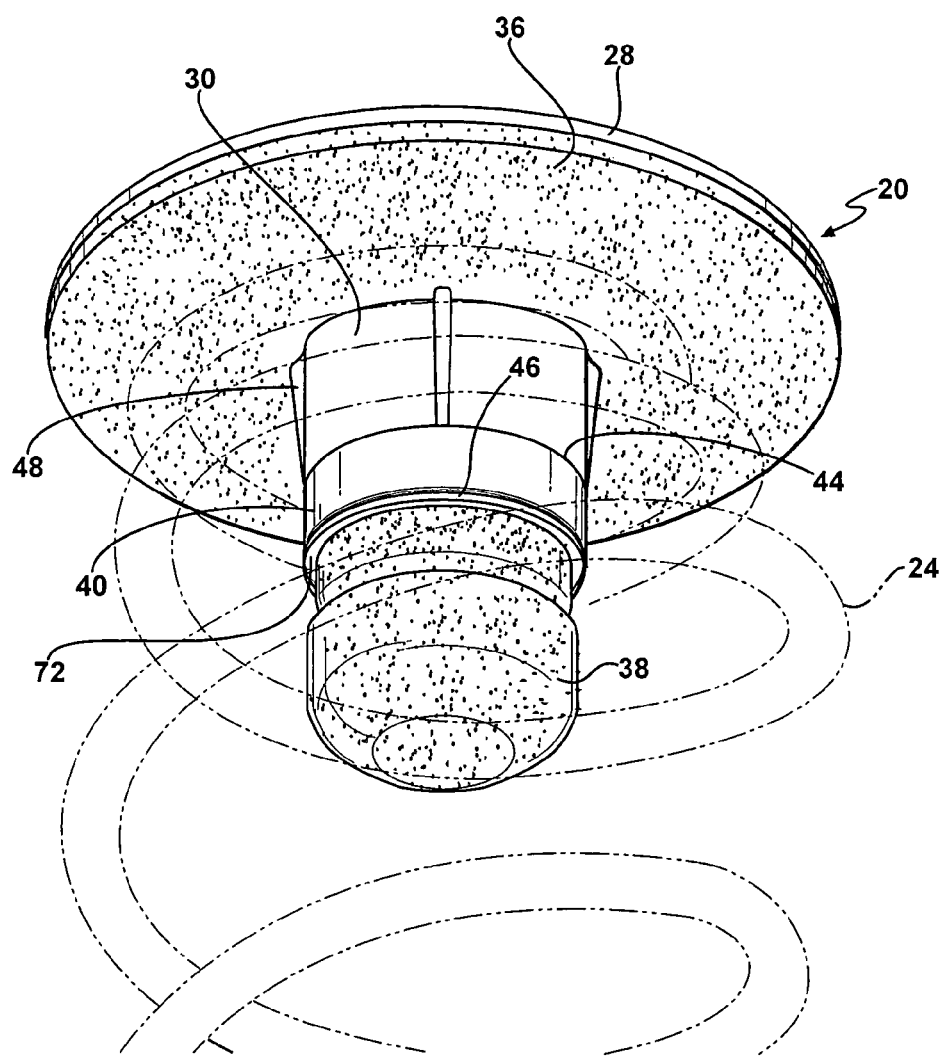
Figure 3:
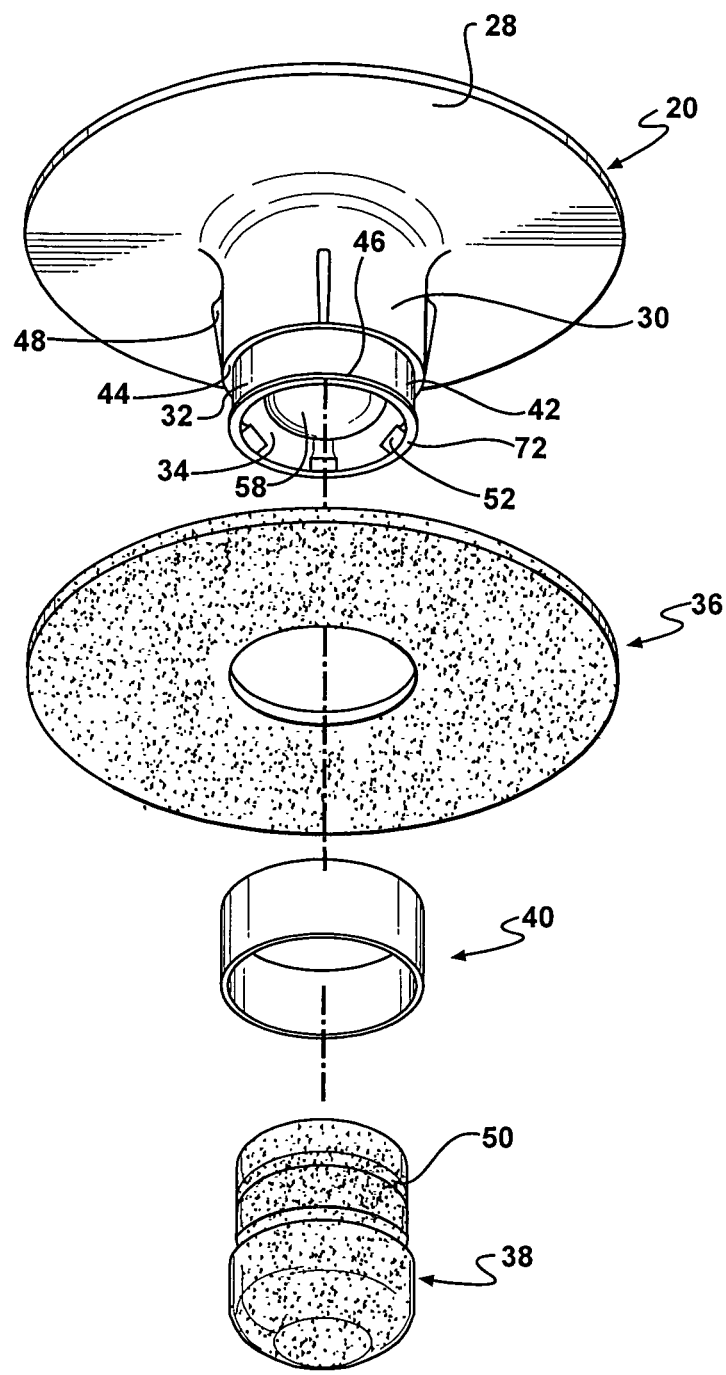
Figure 4:
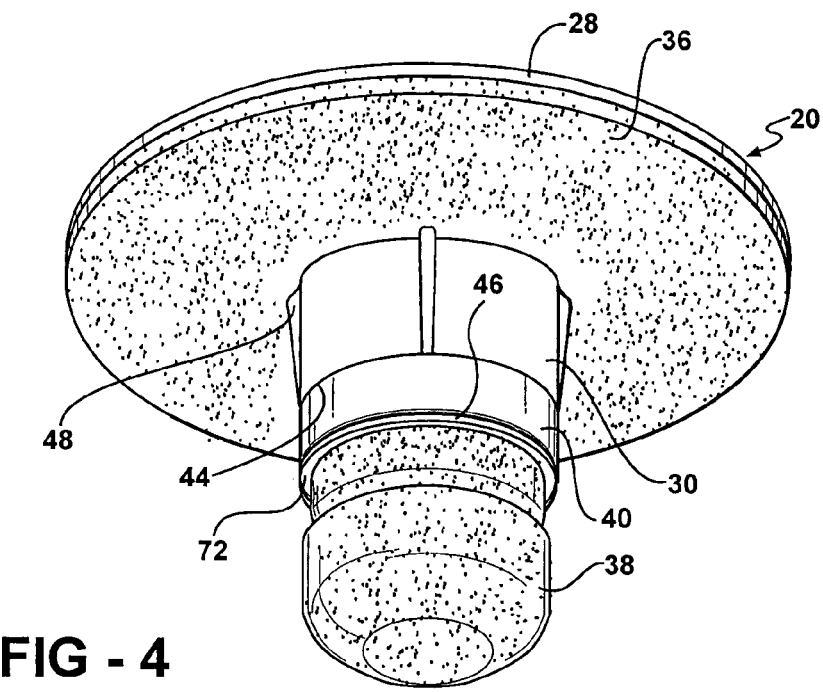
Figure 5:
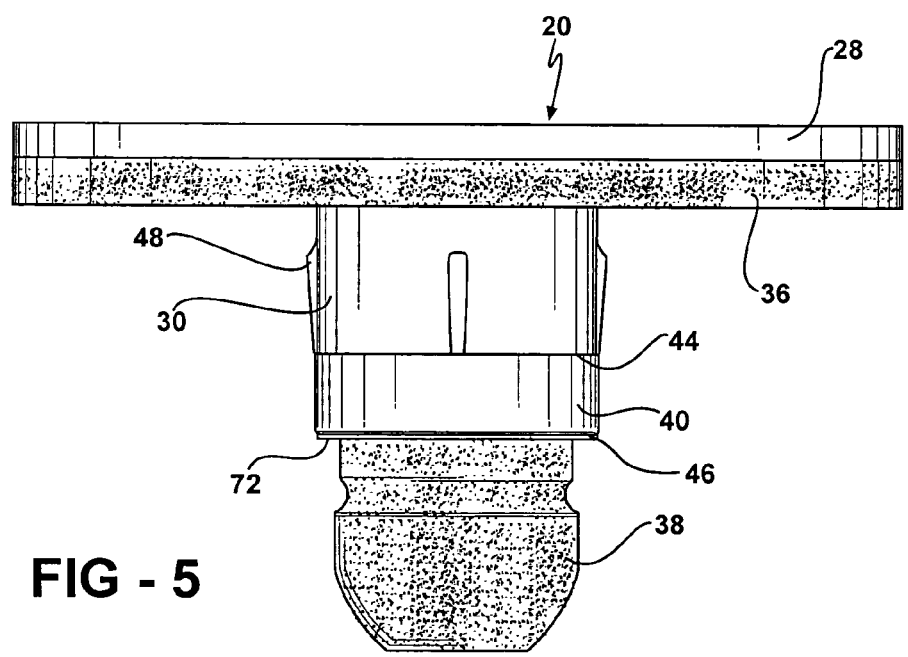

A jounce bumper 38 is disposed in the cavity 34 of the pocket portion 30 and extends from the distal end 72. The jounce bumper 38 will compress and exert radial forces within the cavity 34 against the rim 32 upon a predetermined compression of the coil spring 24. Preferably, the jounce bumper 38 is formed of a polymeric or elastomeric material, such as micro-cellular polyurethane (MPU). The jounce bumper 38 includes an annular groove 50 in which the tabs 52 of the rim 32 engage the groove 50 for retaining the jounce bumper 38 in the cavity 34. As shown in FIG. 1, the jounce bumper 38 presents a hollow 54 in the bottom thereof to define a skirt 56 in which the stem 58 of the rim 32 engages the skirt 56 for forcing the jounce bumper 38 radially outwardly toward the rim 32 and into engagement with the tabs 52.

Figure 6:
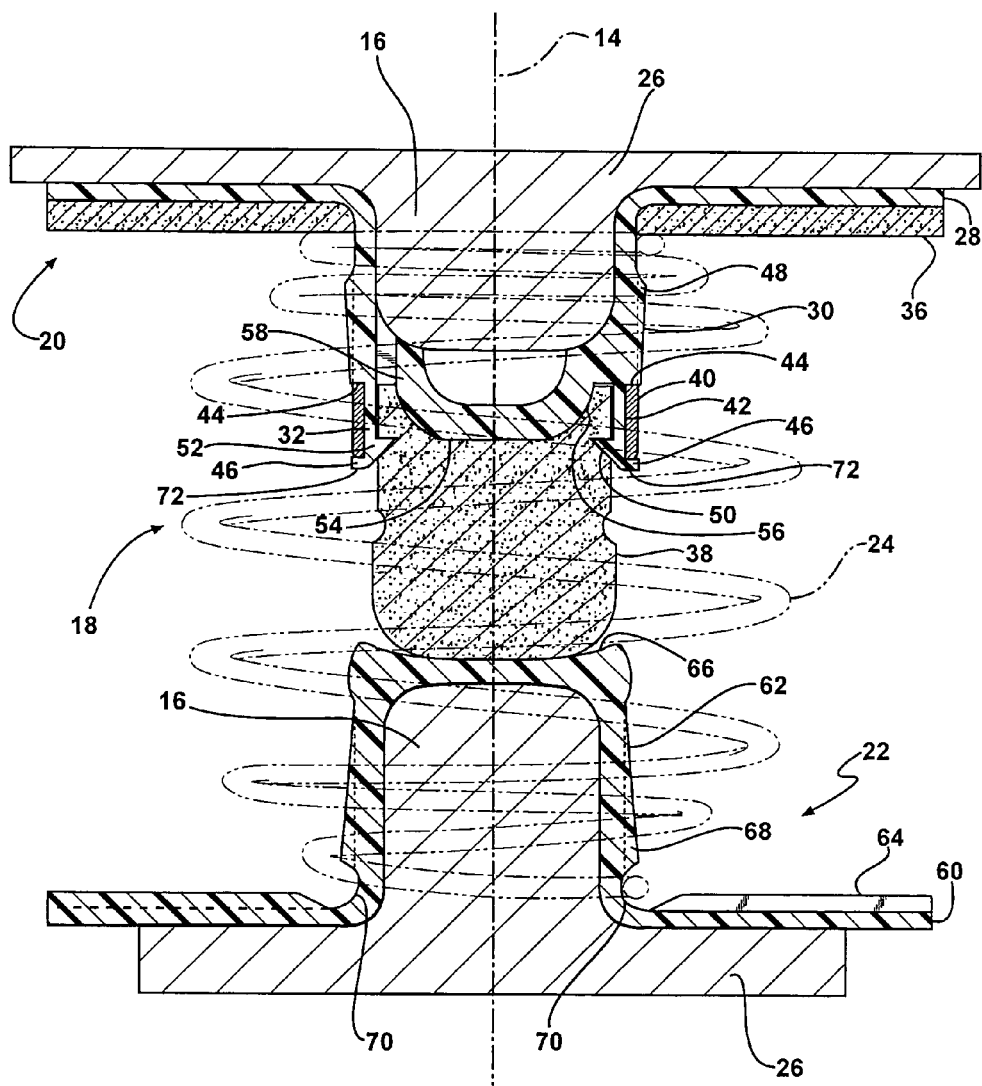

As shown in FIG. 6, the coil spring 24 can be compressed to the point where the jounce bumper 38 hits the second spring seat retainer 22 which causes the jounce bumper 38 to compress and exert forces radially outwardly against the rim 32. The band 40 resists any radial deflection of the rim 32 such that the tabs 52 of the inner surface of the rim 32 remain in continuous contact with the groove 50 to retain the jounce bumper 38 in the first spring seat retainer 20.

Referring to FIGS. 1 and 6, the second spring seat retainer 22 has a similar configuration as the first spring seat retainer 20 with a base portion 60 extending radially from the central axis 14 and a neck portion 62 extending axially from the base portion 60 for supporting the coil spring 24 encircling the neck portion 62. The second spring seat retainer 22 may be similarly formed of a polymeric material or plastic material such as nylon, isoprene, polypropylene, or polyurethane. Preferably, the second spring seat retainer 22 is similarly formed of a one-piece integrated TPU material.

A plurality of radially projecting ridges 64 are spaced about the base portion 60 and are spaced a predetermined distance from the neck portion 62 to define a depression 70 for engaging and retaining the coil spring 24. The ridges 64 are preferably integral with the base portion 60.

The neck portion 62 includes a cap at a top thereof to define a jounce contact surface 66 for engagement with the jounce bumper 38. A plurality of strips 68 are spaced circumferentially about an exterior of the neck portion 62. The strips 68 extend axially a predetermined distance spaced from the base portion 60 to a predetermined distance spaced from the jounce contact surface 66 for engaging and retaining the coil spring 24. The cap and the strips 68 are preferably integral with the neck portion 62.

The invention has been described in an illustrative manner, and it is to be understood that the terminology which has been used is intended to be in the nature of words of description rather than of limitation. Obviously, many modifications and variations of the present invention are possible in light of the above teachings. It is, therefore, to be understood that within the scope of the appended claims, the invention may be practiced otherwise than is specifically described.

What is claimed is:

1. A spring seat retainer comprising:
   a flange extending radially from a central axis;
   a pocket portion extending axially from said flange along said central axis to a distal rim with said distal rim encircling said pocket portion and defining a cavity between said distal rim and said flange for securing a jounce bumper within said cavity;
   said flange and said pocket portion being formed of a homogeneous polymeric material having a first modulus of elasticity;
   a band formed of a metallic material having a second modulus of elasticity greater than said first modulus of elasticity with said band encircling said rim of said pocket portion for preventing bulging of said rim upon exertion of radial forces by the jounce bumper;
   said rim defines a distal end, an inner surface and an outer surface with said outer surface defining a recess extending axially from said distal end to a shoulder and said band presents spaced edges and is disposed in said recess with one of said edges abutting said shoulder.

2. A spring seat retainer as set forth in claim 1 wherein said polymeric material of said pocket portion and said flange is further defined as a thermoplastic polyurethane material.

3. A spring seat retainer as set forth in claim 1 wherein said distal end of said rim includes a protrusion extending over one of said edges of said band opposite said edge abutting said shoulder to retain said band in said recess.

4. A spring seat assembly comprising:
   a spring seat retainer having a base and a pocket portion extending axially from said base to a distal rim defining a cavity with said distal rim encircling said cavity and said pocket portion including a stem disposed between said distal rim and said base to define a bottom of said cavity;
   a securing device extending from said distal rim into said cavity above said stem;
   a jounce bumper mounted to said pocket portion within said cavity by said securing device and extending from said distal rim for exerting radial forces within said cavity against said rim; and
   a restrictor abutting at least a portion of said distal rim of said pocket portion for preventing deformation of said rim upon the exertion of radial forces by said jounce bumper to retain said jounce bumper in said cavity with said restrictor including a band encircling said rim for preventing bulging of said rim under said band.

5. An assembly as set forth in claim 4 wherein said band has a modulus of elasticity that is higher than a modulus of elasticity of said pocket portion.

6. An assembly as set forth in claim 5 wherein said pocket portion is formed of a polymeric material and said band is formed of a metallic material.

7. An assembly as set forth in claim 4 wherein said base is further defined as a flange extending radially from said pocket portion.

8. An assembly as set forth in claim 7 further including a spring isolator abutting said flange of said spring seat retainer.

9. An assembly as set forth in claim 8 wherein said spring isolator extends radially from said pocket portion to an outer edge of said flange.

10. An assembly as set forth in claim 8 wherein said spring isolator is formed of an elastomeric material.

11. An assembly as set forth in claim 10 wherein said elastomeric material of said spring isolator is further defined as micro-cellular polyurethane.

12. An assembly as set forth in claim 4 wherein said spring seat retainer is further defined as a first spring seat retainer and further including a second spring seat retainer.

13. An assembly as set forth in claim 12 wherein said second spring seat retainer includes a base portion extending radially from a central axis and a neck portion extending axially from said base portion.

14. An assembly as set forth in claim 13 further including a plurality of radially projecting ridges spaced about said base portion and spaced from said neck portion to define a depression for engaging a coil spring.

15. An assembly as set forth in claim 13 further including a cap at a top of said neck portion to define a jounce contact surface.

16. An assembly as set forth in claim 15 further including a plurality of strips spaced circumferentially about an exterior of said neck portion and extending axially a predetermined distance spaced from said base portion to a predetermined distance spaced from said jounce contact surface for engaging a coil spring.

17. A spring seat assembly comprising:
a spring seat retainer having a base and a pocket portion extending axially from said base to a distal rim defining a cavity with said distal rim encircling said cavity and said pocket portion including a stem disposed between said distal rim and said base to define a bottom of said cavity;
a securing device extending from said distal rim into said cavity above said stem;
a jounce bumper mounted to said pocket portion within said cavity by said securing device and extending from said distal rim for exerting radial forces within said cavity against said rim; and
a restrictor abutting at least a portion of said distal rim of said pocket portion for preventing deformation of said rim upon the exertion of radial forces by said jounce bumper to retain said jounce bumper in said cavity;
wherein said rim defines a distal end, an inner surface and an outer surface with said outer surface defining a recess extending axially from said distal end to a shoulder and said restrictor presents spaced edges and is disposed in said recess with one of said edges abutting said shoulder.

18. An assembly as set forth in claim 17 wherein said distal end of said rim includes a protrusion extending over one of said edges of said restrictor opposite said edge abutting said shoulder to retain said restrictor in said recess.

19. An assembly as set forth in claim 17 further including ribs spaced about said pocket portion for engaging a coil spring, said ribs extending axially to said shoulder of said recess.

20. A spring seat retainer comprising:
a base;
a pocket portion extending axially from said base to a distal rim defining a cavity with said distal rim encircling said cavity for securing a jounce bumper within said cavity and said pocket portion including a stem disposed between said distal rim and said base to define a bottom of said cavity; and
a restrictor abutting at least a portion of said distal rim of said pocket portion for preventing deformation of said rim upon exertion of radial forces by the jounce bumper with said restrictor being continuously disposed about said rim for preventing bulging of said rim under said restrictor.

21. A spring seat retainer as set forth in claim 20 wherein said pocket portion and said stem are integrally formed.

22. A spring seat retainer as set forth in claim 20 wherein said pocket portion, said stem and said distal rim are integrally formed.

23. A spring seat retainer as set forth in claim 20 wherein said pocket portion and said base are formed of a homogeneous material.

24. A spring seat retainer as set forth in claim 20 wherein said pocket portion and said base are formed of a polymeric material.

25. A spring seat retainer as set forth in claim 24 wherein said polymeric material of said pocket portion and said base is further defined as a thermoplastic polyurethane material.

26. A spring seat retainer comprising:
a base;
a pocket portion extending axially from said base to a distal rim defining a cavity with said distal rim encircling said cavity for securing a jounce bumper within said cavity and said pocket portion including a stem disposed between said distal rim and said base to define a bottom of said cavity; and
a restrictor abutting at least a portion of said distal rim of said pocket portion for preventing deformation of said rim upon exertion of radial forces by the jounce bumper with said restrictor including a band encircling said rim for preventing bulging of said rim under said band.

27. spring seat retainer as set forth in claim 26 wherein said band has a modulus of elasticity that is higher than a modulus of elasticity of said pocket portion.

28. A spring seat retainer as set forth in claim 27 wherein said pocket portion is formed of a polymeric material and said band is formed of a metallic material.

29. A spring seat retainer as set forth in claim 26 wherein said base is further defined as a flange extending radially from said pocket portion.

30. A spring seat retainer comprising:
a base;
a pocket portion extending axially from said base to a distal rim defining a cavity with said distal rim encircling said cavity for securing a jounce bumper within said cavity and said pocket portion including a stem disposed between said distal rim and said base to define a bottom of said cavity; and
a restrictor abutting at least a portion of said distal rim of said pocket portion for preventing deformation of said rim upon exertion of radial forces by the jounce bumper wherein said rim defines a distal end, an inner surface and an outer surface with said outer surface defining a recess extending axially from said distal end to a shoulder and said restrictor presents spaced edges and is disposed in said recess with one of said edges abutting said shoulder.

31. A spring seat retainer as set forth in claim 30 wherein said distal end of said rim includes a protrusion extending over one of said edges of said restrictor opposite said edge abutting said shoulder to retain said restrictor in said recess.

32. A spring seat assembly comprising:
a spring seat retainer having a base and a pocket portion extending axially from said base to a distal rim defining a cavity with said distal rim encircling said cavity and said pocket portion including a stem disposed between said distal rim and said base to define a bottom of said cavity;
a securing device extending from said distal rim into said cavity above said stem;
a jounce bumper mounted to said pocket portion within said cavity by said securing device and extending from said distal rim for exerting radial forces within said cavity against said rim; and
a restrictor abutting at least a portion of said distal rim of said pocket portion for preventing deformation of said rim upon the exertion of radial forces by said jounce bumper to retain said jounce bumper in said cavity with said securing device and said distal rim being integrally formed.

33. An assembly as set forth in claim 32 wherein said restrictor is continuously disposed about said rim for preventing bulging of said rim under said restrictor.

34. An assembly as set forth in claim 32 wherein said pocket portion and said base are formed of a homogeneous material.

35. An assembly as set forth in claim 32 wherein said pocket portion and said base are formed of a polymeric material.

36. An assembly as set forth in claim 35 wherein said polymeric material of said pocket portion and said base is further defined as a thermoplastic polyurethane material.

37. A spring seat assembly comprising:
a spring seat retainer having a base and a pocket portion extending axially from said base to a distal rim defining a cavity with said distal rim encircling said cavity and said pocket portion including a stem disposed between said distal rim and said base to define a bottom of said cavity;
a securing device extending from said distal rim into said cavity above said stem;
a jounce bumper mounted to said pocket portion within said cavity by said securing device and extending from said distal rim for exerting radial forces within said cavity against said rim; and
a restrictor abutting at least a portion of said distal rim of said pocket portion for preventing deformation of said rim upon the exertion of radial forces by said jounce bumper to retain said jounce bumper in said cavity with said distal rim, said securing device and said stem being integrally formed.

* * * * *